J. STRZYCZKOWSKI.
AUTO TIRE.
APPLICATION FILED MAR. 3, 1920.

1,370,714.

Patented Mar. 8, 1921.
2 SHEETS—SHEET 1.

Inventor
JULIAN STRZYCZKOWSKI

By his Attorneys

J. STRZYCZKOWSKI.
AUTO TIRE.
APPLICATION FILED MAR. 3, 1920.

1,370,714.

Patented Mar. 8, 1921.

Inventor
JULIAN STRZYCZKOWSKI
By his Attorneys
Richardson Geier

UNITED STATES PATENT OFFICE.

JULIAN STRZYCZKOWSKI, OF NEW YORK, N. Y.

AUTO-TIRE.

1,370,714.  Specification of Letters Patent.  Patented Mar. 8, 1921.

Application filed March 3, 1920. Serial No. 362,975.

*To all whom it may concern:*

Be it known that I, JULIAN STRZYCZKOWSKI, a citizen of the United States, residing at New York, county of New York, and State of New York, have invented certain new and useful Improvements in Auto-Tires, of which the following is a specification.

This invention relates to tires for vehicle wheels, being intended more particularly for application to automobile wheels although not of necessity limited to such use.

The invention has for a general object to lessen the expense in connection with the pneumatic or other resilient tires both by reducing the initial cost thereof and by increasing the life of the tire.

More specifically speaking the invention has for an object to provide a tire with an inexpensive tread or shoe element which may be readily replaced when worn and which completely protects the flexible parts of the tire.

For further comprehension of the invention, and of the objects and advantages thereof, reference will be had to the following description and accompanying drawings, and to the appended claims in which the various novel features of the invention are more particularly set forth.

Figure 1 of the drawings is a transverse sectional view through a tire having my invention applied thereto, this view being taken on the line 1—1 of Fig. 3.

Figure 1:
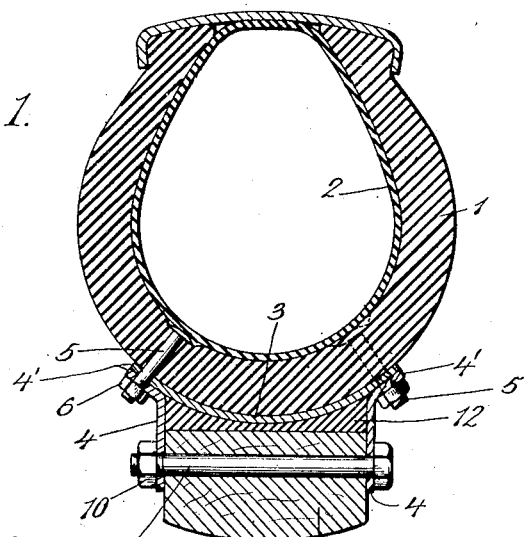
Figure 2:
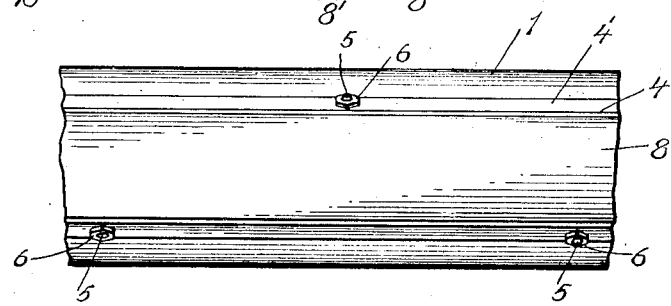
Fig. 2 is a fragmentary plan view on a smaller scale.
Figure 3:
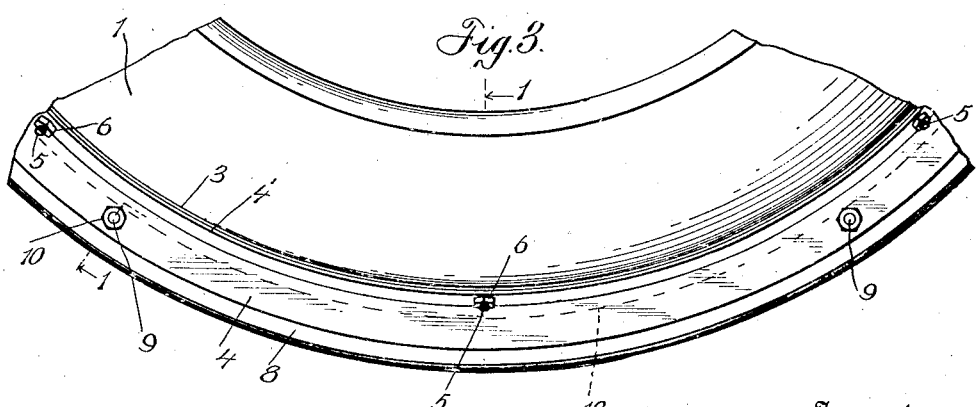
Fig. 3 is a fragmentary side view on the same scale as Fig. 2.

In the modification shown in Figs. 1, 2 and 3 the invention is applied to a pneumatic tire of an ordinary type as a supplementary tread or shoe therefor, the outer tube of the tire being shown at 1 and the inner tube at 2. In this embodiment of the invention I provide a metallic facing ring 3 of segmental shape in cross section to fit snugly upon the tread portion of the outer tube 1. Mounted on opposite sides of this facing ring 3 are a pair of vertical flange-rings 4 between which the tread member or shoe is confined as will be presently set forth. These flange-rings 4 have their inner edges 4' bent diagonally away from one another as shown, to lie in flat contact with the edges of the facing ring 3. The latter is secured to the outer tube 1, and the flange-rings 4 are secured thereto by means of flat-headed bolts 5 which project outwardly through the said outer tube and through suitable registering openings in the edges of the facing ring and flange-rings, and having nuts 6 secured on their ends. These bolts are spaced evenly circumferentially of the tire as indicated in Fig. 3, the bolts on opposite sides being staggered with respect to each other as shown in Fig. 2. With this arrangement I provide a suitable seat on the tire in which the shoe, or tread, is firmly held.

The shoe or tread preferably comprises a rim 8 made of wood and fitting snugly between the flange-rings 4, this rim being preferably treated with creosote or other suitable material which will impregnate the fibers of the wood and increase its durability and resistance to wear. The tread surface of this rim 8 is preferably rounded in correspondence to the tire as indicated at 8'. The flange-rings 4 only extend partially across the sides of the rim 8 and the latter is secured thereto by means of the headed bolts 9 which pass through suitable registering openings in the rim and flange-rings and have nuts 10 threaded thereon. A filler strip 12 of rubber or the like may be interposed between the tread rim 8 and the facing ring 3.

Figure 4:
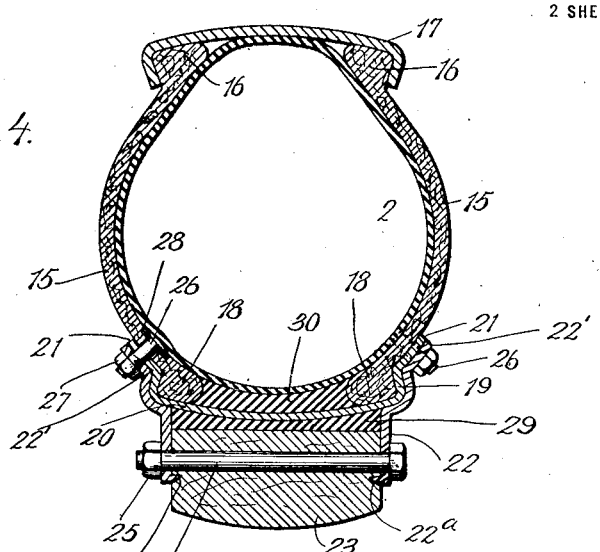
Fig. 4 is a similar view to Fig. 1 showing a modified manner of constructing the tire, being taken on the line 4—4 of Fig. 6.
Figure 5:
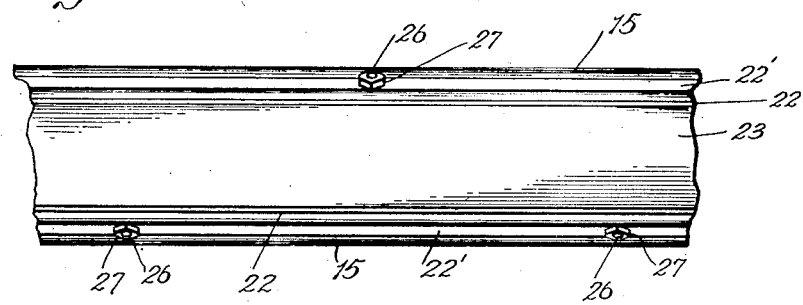
Fig. 5 is a fragmentary plan view thereof.
Figure 6:
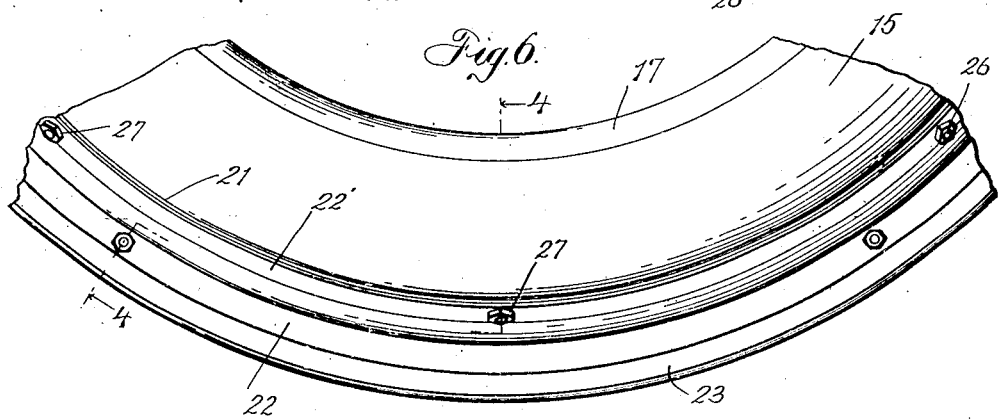
Fig. 6 is a fragmentary side view thereof.

In the embodiment of the invention shown in Figs. 4, 5 and 6, the tread structure above described is combined in slightly modified form with a novel covering device for the inner tube which may be constructed at considerably less expense than the usual outer tube shown in Fig. 1. In this modification the inner tube 2 is inclosed on opposite sides by separate covering members 15 which may be conveniently constructed of several plies of strong canvas suitably secured together, these members being folded or rolled upon themselves at the inner edges thereof to produce the usual beads 16 adapted to be engaged by the flanged rim 17 of the wheel in a well known manner, and at their outer edges to produce substantially similar beads 18. These beads 18 are adapted to be engaged or inclosed by the inturned side flanges 19 on a facing ring 20 similar in the main to the facing ring 3, these side flanges being bent outwardly at their extremities as at 21 in a generally diagonal direction to conform to the contour of the tire and lie flat against the side cover members 15 adjacent the beads 18.

Mounted on opposite sides of this facing ring 20 are a pair of flange-rings 22 corresponding in general features of construction to the flange-rings 4. The inner portions 22' of these flange rings lie upon and are bent similarly to the flanged edges 19, 21 of the facing-ring 20, while the outer portions of the flange-rings 22 project across the sides of a shoe or tread 23 similar in all respects to the shoe 8 and secured in place in like manner by headed bolts 24 having nuts 25 on the ends thereof. The flange-rings 22 may each have a laterally projecting bead 22ª at its outer edge engaging in a groove in the tread rim 23. The side cover members 15, facing ring 20, and flange-rings 22 are all secured together by flatheaded bolts 26 passing through said parts and having nuts 27 threaded on their ends, these bolts being spaced around the tire similarly to the bolts 5 and being staggered on opposite sides of the tire in the same manner. Metal washers or strips such as 28 may be interposed between the heads of the bolts 24 and the inner faces of the canvas side covers 15.

Interposed between the shoe 23 and the facing ring 20 is a rubber filler strip 29, similar to the strip 12 while a second rubber filler strip 30 may be placed on the inner surface of the facing ring 20 between the beads 18 of the canvas covers 15.

With my invention, whether applied to an old type of tire as shown in Figs. 1 to 3 or embodied in a new type of tire as shown in Figs. 4 to 6, the upkeep cost of the tire is greatly reduced as the wooden treads or shoes can be replaced at comparatively small cost when worn. In addition, the tire shown in Figs. 4 to 6 can be manufactured at a considerable less expense than the ordinary tire and a double saving in tire expense is thus effected while at the same time the high degree of resiliency characteristic of the pneumatic tire is preserved.

Instead of making the tread rim of wood it may be constructed of fiber or other suitable materials and it is to be understood of course that various changes or modifications might be made in the construction as herein disclosed without departing from the spirit of the invention, and the right is reserved to all changes and modifications coming within the scope and spirit of the appended claims.

Having thus described my invention what I claim as new and desire to protect by Letters Patent of the United States is as follows:

1. In an automobile tire, a flexible tire cover divided circumferentially into two side cover members, a facing ring securing the edges of said cover members together, flange-rings projecting outwardly from the sides of said facing ring and having their inner portions bent to lie in flat contact with the sides of said facing ring, a tread rim confined between said flange-rings, and bolts passing through said cover members and said facing ring and flange-rings and securing said parts together.

2. In an automobile tire, a flexible tire cover divided circumferentially into two side cover members, said cover members having beads formed on their outer edges, a facing ring having side flanges engaging said beads and the adjacent portions of the cover members, flange-rings projecting outwardly from the flanged sides of said facing ring and having their inner edges bent to lie in flat contact with the said flanged sides of the facing ring, a tread rim confined between said flange-rings, and bolts passing through said cover members and the said contacting portions of the facing ring and flange-rings and securing said parts together.

3. In an automobile tire, a flexible tire cover divided circumferentially into two side cover members, said cover members having beads formed on their outer edges, a facing ring having side flanges engaging said beads and the adjacent portions of the cover members, flange-rings projecting outwardly from the flanged sides of said facing ring and having their inner edges bent to lie in flat contact with the said flanged sides of the facing ring, a tread rim confined between said flange-rings, and bolts passing through said cover members and the said contacting portions of the facing ring and flange-rings and securing said parts together, and flexible filler strips upon the outer and inner surfaces of said facing ring.

4. In an automobile tire, a flexible tire cover divided circumferentially into two side cover members, a facing ring securing the outer edges of said side cover members together, a tread rim mounted on said facing ring, a flexible filler strip upon the inside of said facing ring between the separated edges of said side cover members and a flexible filler strip interposed between said tread rim and facing ring.

In testimony whereof I have affixed my signature.

JULIAN STRZYCZKOWSKI.